(12) United States Patent
Hiruta et al.

(10) Patent No.: US 9,340,177 B2
(45) Date of Patent: May 17, 2016

(54) AIRBAG AND AIRBAG DEVICE

(71) Applicant: Takata Corporation, Tokyo (JP)

(72) Inventors: Teruhiko Hiruta, Tokyo (JP); Kimihiro Koshikawa, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 0 days.

(21) Appl. No.: 14/429,975

(22) PCT Filed: Sep. 10, 2013

(86) PCT No.: PCT/JP2013/074396
§ 371 (c)(1),
(2) Date: Mar. 20, 2015

(87) PCT Pub. No.: WO2014/045943
PCT Pub. Date: Mar. 27, 2014

(65) Prior Publication Data
US 2015/0239421 A1   Aug. 27, 2015

(30) Foreign Application Priority Data

Sep. 21, 2012  (JP) .................................. 2012-208903

(51) Int. Cl.
*B60R 21/16*   (2006.01)
*B60R 21/239*   (2006.01)
*B60R 21/23*   (2006.01)

(52) U.S. Cl.
CPC ............... *B60R 21/239* (2013.01); *B60R 21/23* (2013.01); *B60R 2021/2395* (2013.01)

(58) Field of Classification Search
USPC ..................... 280/743.1, 743.2, 731
See application file for complete search history.

(56) References Cited

U.S. PATENT DOCUMENTS 7,726,685 B2 * 6/2010 Abe ...................... B60R 21/232
280/736
8,070,183 B2 * 12/2011 Kumagai ............ B60R 21/2338
280/732

(Continued)

FOREIGN PATENT DOCUMENTS

| JP | 11-348713 | 12/1999 |
| JP | 2001-277991 | 10/2001 |

(Continued)

OTHER PUBLICATIONS

International Search Report dated Dec. 17, 2013 issued in PCT/JP2013/074396.

*Primary Examiner* — Toan To
(74) *Attorney, Agent, or Firm* — Foley & Lardner LLP

(57) ABSTRACT

In an airbag, an airbag main body is formed into a bag so as to comprise at least a front panel and a rear panel in an inflated and deployed state, vent holes are formed on the rear panel, vent covers that open and close the vent holes are attached to an outer surface of the rear panel, patch members are attached to the vent covers, and opening degrees of the vent holes are regulated by the vent covers and the patch members inflating in cooperation using a portion of the pressurized gas supplied to the interior of the airbag main body when the airbag main body inflates and deploys.

5 Claims, 16 Drawing Sheets

(56) References Cited

U.S. PATENT DOCUMENTS

| | | | |
|---|---|---|---|
| 8,308,191 B2 * | 11/2012 | Hiruta | B60R 21/239 280/736 |
| 8,322,748 B2 | 12/2012 | Abe et al. | |
| 8,353,532 B2 | 1/2013 | Abe et al. | |
| 8,419,055 B2 * | 4/2013 | Chida | B60R 21/239 280/731 |
| 8,696,022 B2 * | 4/2014 | Fischer | B60R 21/2338 280/739 |
| 8,870,223 B2 * | 10/2014 | Choi | B60R 21/2338 280/739 |
| 2007/0045997 A1 * | 3/2007 | Abe | B60R 21/231 280/729 |
| 2012/0074677 A1 | 3/2012 | Hiruta et al. | |

FOREIGN PATENT DOCUMENTS

| | | |
|---|---|---|
| JP | 2008-179337 | 8/2008 |
| JP | 2008-265721 | 11/2008 |
| JP | 2008-308139 | 12/2008 |
| JP | 2012-035772 | 2/2012 |
| JP | 2012-066746 | 4/2012 |
| WO | WO-2008/136336 | 11/2008 |

\* cited by examiner

FIG. 6A
FIG. 6B
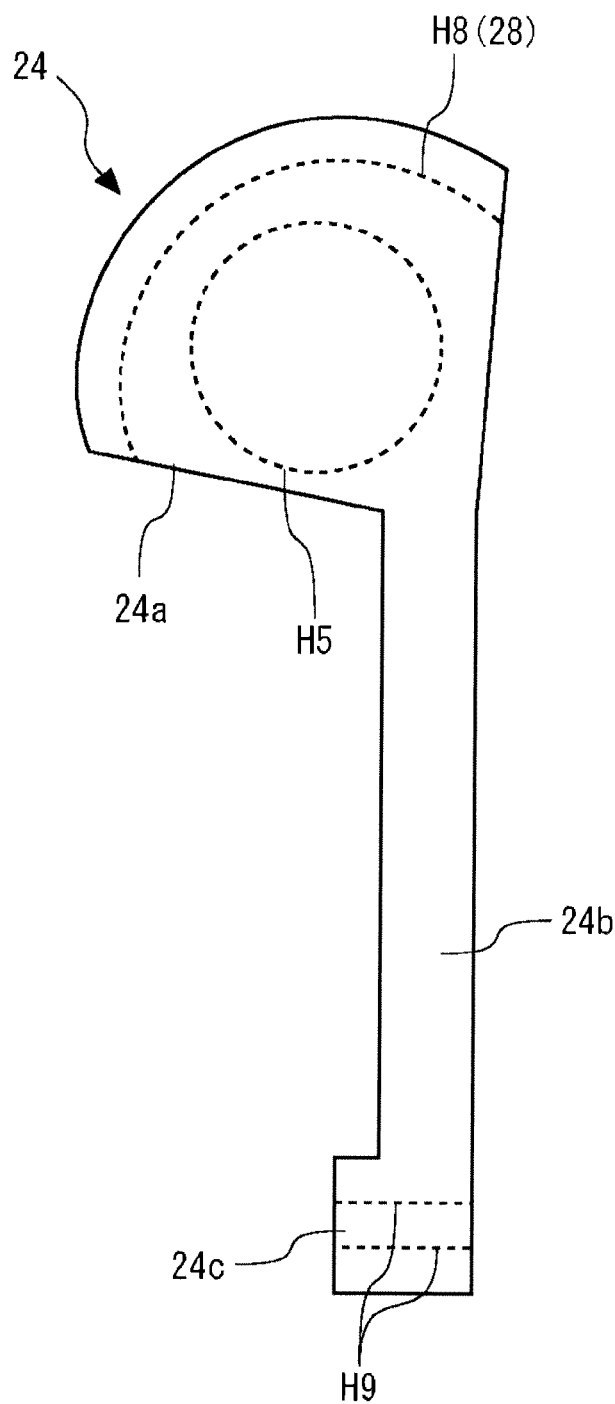
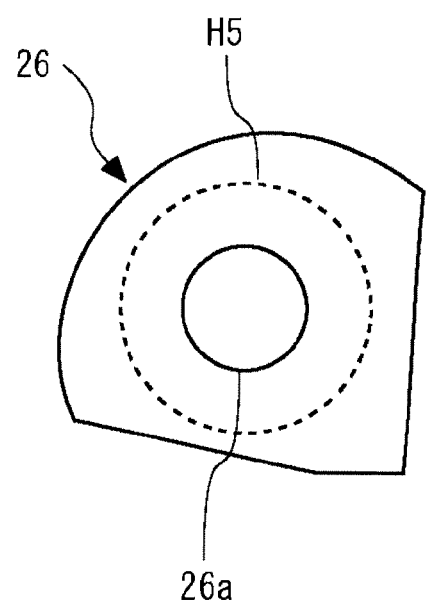

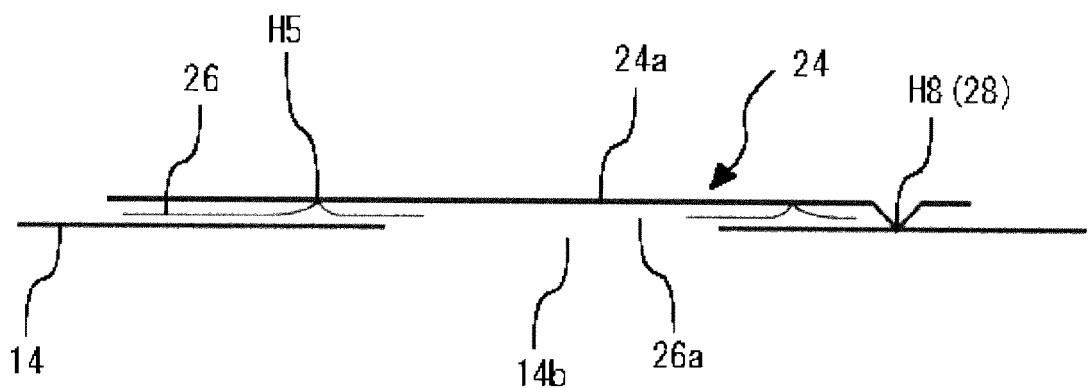
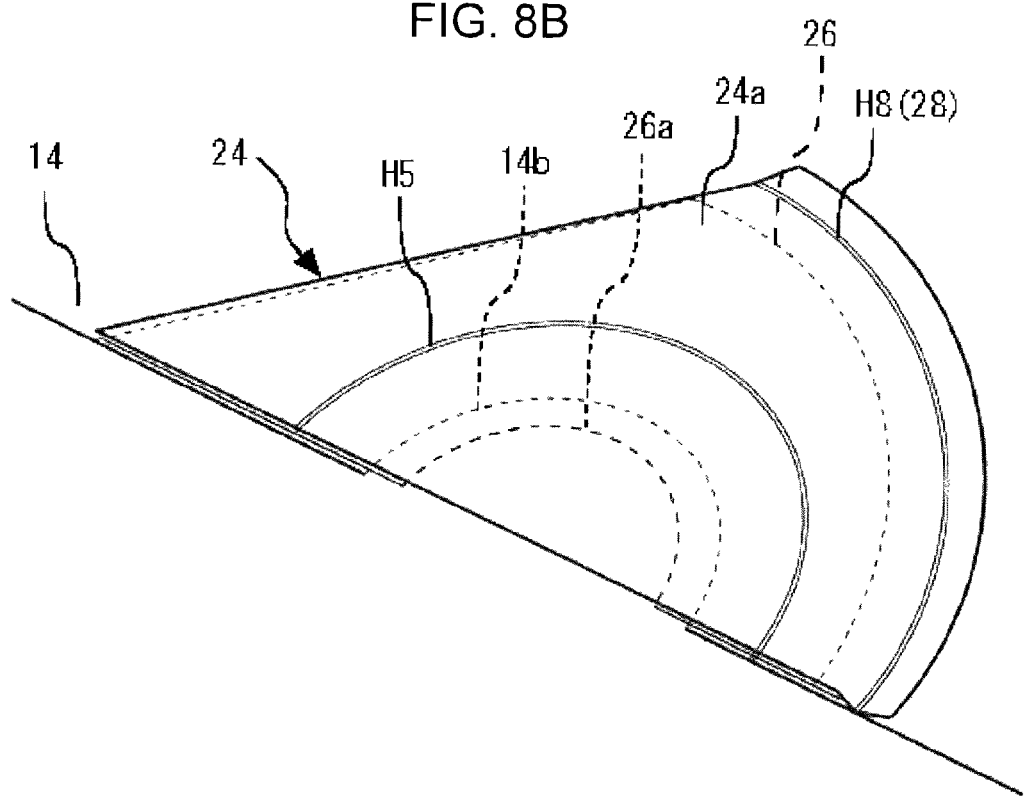

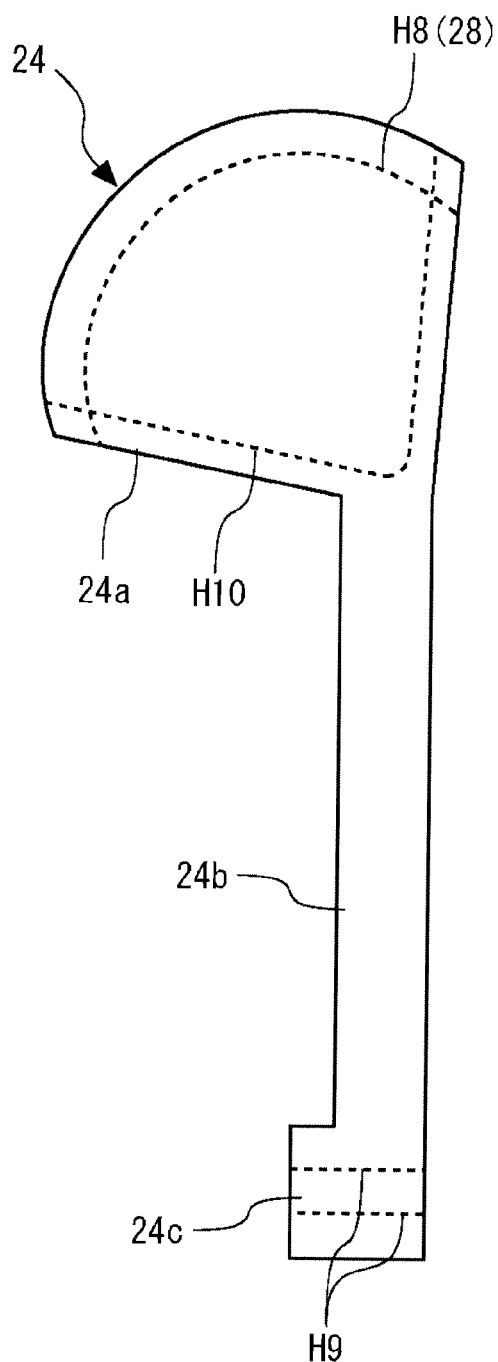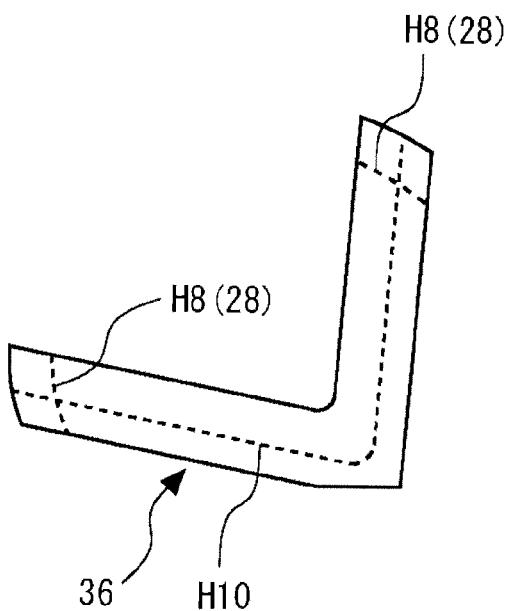

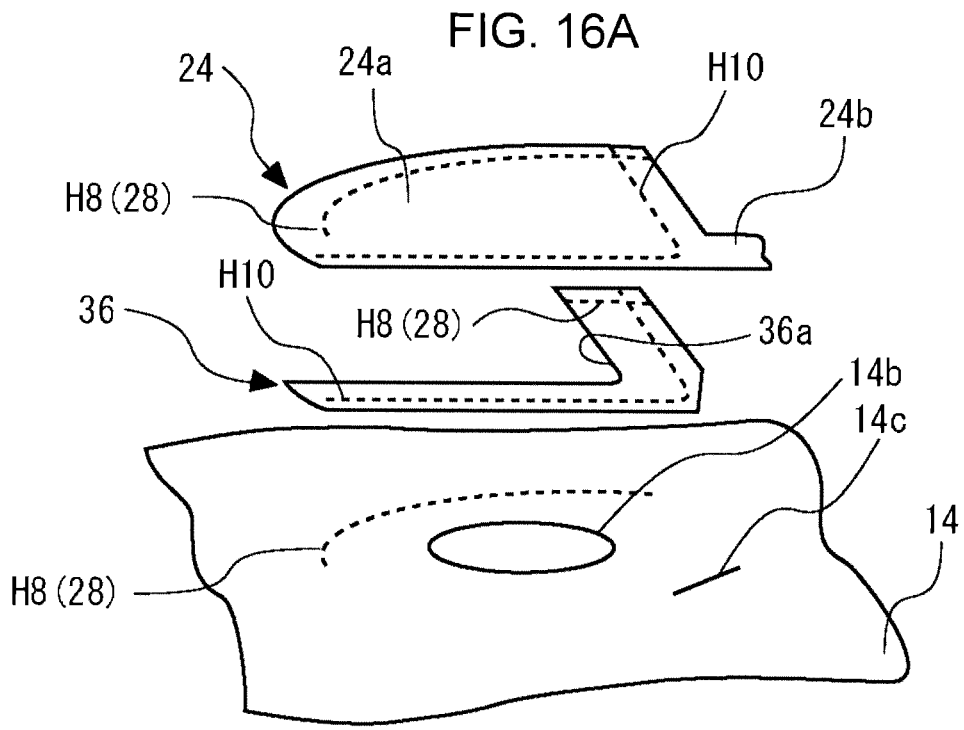

AIRBAG AND AIRBAG DEVICE

BACKGROUND OF THE INVENTION

1. Field of the Invention

The present invention relates to an airbag for ensuring the safety of an occupant in the event of collision of the vehicle or the like, and an airbag device that uses the same.

2. Description of the Related Art

There have heretofore been known airbag devices whereby an inflator activates in the event of an emergency, such as collision or rollover of the vehicle, and an airbag formed into a bag inflates and deploys from a folded state by pressurized gas jetted from this inflator, restraining the occupant.

The airbag used in the airbag device comprises an airbag main body formed into a bag so as to comprise at least a first panel and a second panel in the inflated and deployed state, and a vent hole formed on the second panel. When an occupant contacts the inflated and deployed airbag main body, the pressurized gas is made to discharge from the interior of the airbag main body via this vent hole. With this arrangement, it is possible to smoothly receive and hold the occupant by the airbag main body.

In recent years, there have been proposed airbags configured so that the vent hole is in a closed or slightly opening degree until the internal pressure of the airbag main body reaches a predetermined value or higher, and then is in an open or fully opening degree when the internal pressure of the airbag reaches the predetermined value or higher and an occupant contacts the airbag (refer to WO 2008/136336 and JP, A, 2008-308139, for example).

SUMMARY OF THE INVENTION

Problems to be Solved by the Invention

In the art disclosed in WO 2008/136336, an opening/closing member provided on the outside of the vent hole is opened and closed by a tether that passes through the airbag interior when the airbag inflates and deploys. Accordingly, the operational behavior of the tether when the vent hole is opened and closed is easily affected by the pressurized gas, making it difficult to smoothly control the closed position of the vent hole with high accuracy. As a result, to ensure the internal pressure of the airbag main body with high accuracy, complex setups that decrease the capacity of the airbag main body, increase the jetting ability of the pressurized gas jetted from the inflator, and the like are necessary.

In the art disclosed in JP, A, 2008-308139, a dedicated opening/closing device for adjusting the opening degree of the vent hole is required. This results in an increase in the size of the airbag device in order to secure space for attaching the opening/closing device and, furthermore, an increase in the cost of the airbag device.

It is therefore an object of the present invention to provide an airbag and an airbag device capable of smoothly controlling the closed position of the vent hole with high accuracy using a relatively simple and low cost structure without complex setup.

Means for Solving the Problems

In order to achieve the above-described object, according to the first invention, there is provided an airbag comprising an airbag main body formed into a bag so as to comprise at least a first panel on a side facing an occupant and a second panel on a side not facing the occupant in an inflated and deployed state, at least one vent hole formed on the second panel, at least one vent cover that is attached to an outer surface of the second panel and opens and closes the vent hole, and at least one patch member that is joined to the vent cover between the second panel and the vent cover and has an opening that communicates with the vent hole.

According to the airbag of the first invention, the airbag main body is formed into a bag so as to comprise at least a first panel and a second panel in an inflated and deployed state, a vent hole is formed on the second panel, and a vent cover that opens and closes the vent hole is attached to an outer surface of the second panel.

Hence, when the inflator activates in the event of an emergency such as vehicle collision or rollover, the airbag formed into a bag inflates and deploys from a folded state into a bag shape by the pressurized gas jetted from this inflator, and an occupant contacts the inflated and deployed airbag main body, the airbag main body can receive and hold (restrain) the occupant.

Further, with the airbag main body inflated and deployed, the first panel here is a panel that constitutes the surface that faces (lines up with) the occupant, that is, the front surface that the occupant actually contacts (using the occupant as reference). Further, the second panel refers to a surface other than the first panel of the three-dimensional shape of the airbag main body when inflated and deployed into a bag shape and, according to the three-dimensional shape, refers to the bottom surface that serves as the back side of the front surface, or multiple surfaces such as the bottom surface, side surfaces, and the like.

Furthermore, according to the airbag of the first invention, a patch member is joined to the vent cover so as to be positioned between the second panel and vent cover, and an opening that communicates with the vent hole is provided on this patch member. Then, the opening degree of the vent hole is regulated using a portion of the pressurized gas supplied to the interior of the airbag main body when the airbag main body inflates and deploys. That is, when the pressurized gas is introduced into the interior of the airbag main body, the gas attempts to be released from the vent hole. Hence, the pressurized gas that attempts to be released is captured between the vent cover and patch member (specifically, a space for gas accumulation formed on the outer circumference side of the opening, between the vent cover and patch member). At this time, the joined body of the vent cover and patch member acts further on the outside than the opening that communicates with the vent hole so as to block the vent hole while inflating, making it possible to set the opening degree of the vent hole to a closed or slightly open state. With this arrangement, it is possible to maintain a high internal pressure of the airbag main body.

On the other hand, when an occupant contacts the airbag main body, the vent cover is pushed out by the pressure, making it possible to open the vent hole, vent the pressurized gas inside the airbag main body to the exterior, and smoothly receive and hold the occupant.

According to the second invention, in the airbag according to the first invention, the vent cover comprises a hinge part joined with the second panel on one side, and a regulating member that regulates an opening degree of the vent cover on the other side.

According to the airbag of the second invention, a hinge part joined with the second panel is provided on one side (the introduction direction downstream side of the pressurized gas introduced into the airbag main body, for example) of the vent cover. With this arrangement, it is possible to receive and hold the pressurized gas that is introduced into the airbag main body and attempts to leak from the vent hole by the hinge part, making it easier to suppress the opening of the vent cover and, at the same time, easier to inflate the airbag main body by the cooperation with the patch member. Further, a regulating member that regulates the opening degree of the vent cover is provided on the other side (that is, the reverse side of the hinge part) of the vent cover. With this arrangement, when the airbag main body inflates by the cooperation with the patch member, it is possible to press the patch member on the vent hole and more easily and highly ensure the sealing position of the vent hole.

According to the third invention, in the airbag according to the first or the second invention, the patch member communicates with the vent hole by a hole facing the vent hole serving as the opening, and is joined to the vent cover in an area that surrounds an outer circumference side of the hole.

Furthermore, according to the airbag of the third invention, the opening of the patch member is established as a hole facing the vent hole and, moreover, the patch member is joined to the vent cover in an area that surrounds the outer circumference side of the opening. Then, the opening degree of the vent hole is regulated using a portion of the pressurized gas supplied to the interior of the airbag main body when the airbag main body inflates and deploys. That is, when the pressurized gas is introduced into the interior of the airbag main body, the gas attempts to be released from the vent hole. Hence, the pressurized gas that attempts to be released is captured between the vent cover and patch member (specifically, a space for gas accumulation formed on the outer circumference side of the opening, between the vent cover and patch member). At this time, in particular, the patch member is joined to the vent cover so as to surround the opening facing the vent hole, thereby causing the pressurized gas that attempts to leak from the vent hole to be efficiently captured in the space for gas accumulation described above from the opening. As a result, the joined body of the vent cover and patch member acts so as to block the vent hole while inflating, making it possible to set the opening degree of the vent hole to a closed or slightly open state. With this arrangement, it is possible to maintain a high internal pressure of the airbag main body.

According to the fourth invention, in the airbag according to the second invention, the vent cover is formed into a substantially fan shape that is larger than the vent hole, with an arc-shaped part of one side thereof serving as the hinge part, the patch member is a substantially V- and strip-shaped member that extends along the other two sides of the vent cover, and an area near an outer edge of the strip-shaped member is joined with the vent cover and an inner edge side of the strip-shaped member is set as a free end.

According to the airbag of the fourth invention, a substantially V-shaped patch member is joined to a substantially fan-shaped vent cover, on the two sides of the remaining edges excluding the hinge part, making it possible to communicate with the vent hole using an inside part (interior angle side) sandwiched on the acute angle side by the V-shaped two sides of this patch member as an opening, and capture the pressurized gas that attempts to be released from the vent hole between the vent cover and patch member by the cooperation of the vent cover and patch member. Accordingly, a small substantially V-shaped patch member just needs to be disposed in only the part corresponding to the two sides that serve as the remaining edges excluding the hinge part, making it possible to reduce the material cost of the patch member.

According to the fifth invention, in the airbag according to the fourth invention, the vent cover is joined with the second panel so that an interior angle formed by line segments connecting a center of the vent hole and both ends of the hinge part is 180° or less.

According to the airbag of the fifth invention, it is possible to ensure a large opening area of the vent hole positioned further on the outside than the line that connects both ends of the hinge part (the strip-shaped member side opposite the hinge part), making it possible to ensure high venting efficiency of the pressurized gas from the vent hole.

According to the six invention, there is provided an airbag device in the first invention and an inflator that supplies a pressurized gas to the airbag.

According to the airbag device of the sixth invention, it is possible to apply the vent cover and patch member to the vent hole of an airbag device comprising an inflator that supplies pressurized gas to an airbag.

Advantages of the Invention

According to the airbag and airbag device of the present invention, it is possible to smoothly control the closed position of the vent hole with high accuracy using a relatively simple and low cost structure, without complex setup. This makes it possible to more easily vent the pressurized gas after an occupant contacts the airbag while maintaining a high internal pressure until the airbag is completely inflated and deployed.

BRIEF DESCRIPTION OF THE DRAWINGS

FIG. 6A is a front view of the vent cover, and FIG. 6B is a front view of the patch member, showing an airbag related to an embodiment of the present invention.

FIG. 8A is a cross-sectional view of the main parts before inflation, and FIG. 8B is a partial perspective view of the main parts before inflation, showing an airbag related to an embodiment of the present invention.

FIG. 12A is a front view of the vent cover, and FIG. 12B is a front view of the patch member, showing an airbag related to a modification of an embodiment of the present invention.

FIG. 16A is an exploded perspective view of the main parts, and FIG. 16B is a front view of the main parts, showing an airbag related to an application example of a modification of an embodiment of the present invention.

DETAILED DESCRIPTION OF THE PREFERRED EMBODIMENTS

Next, the airbag and airbag device related to an embodiment of the present invention will be described with reference to accompanying drawings.

Figure 1:
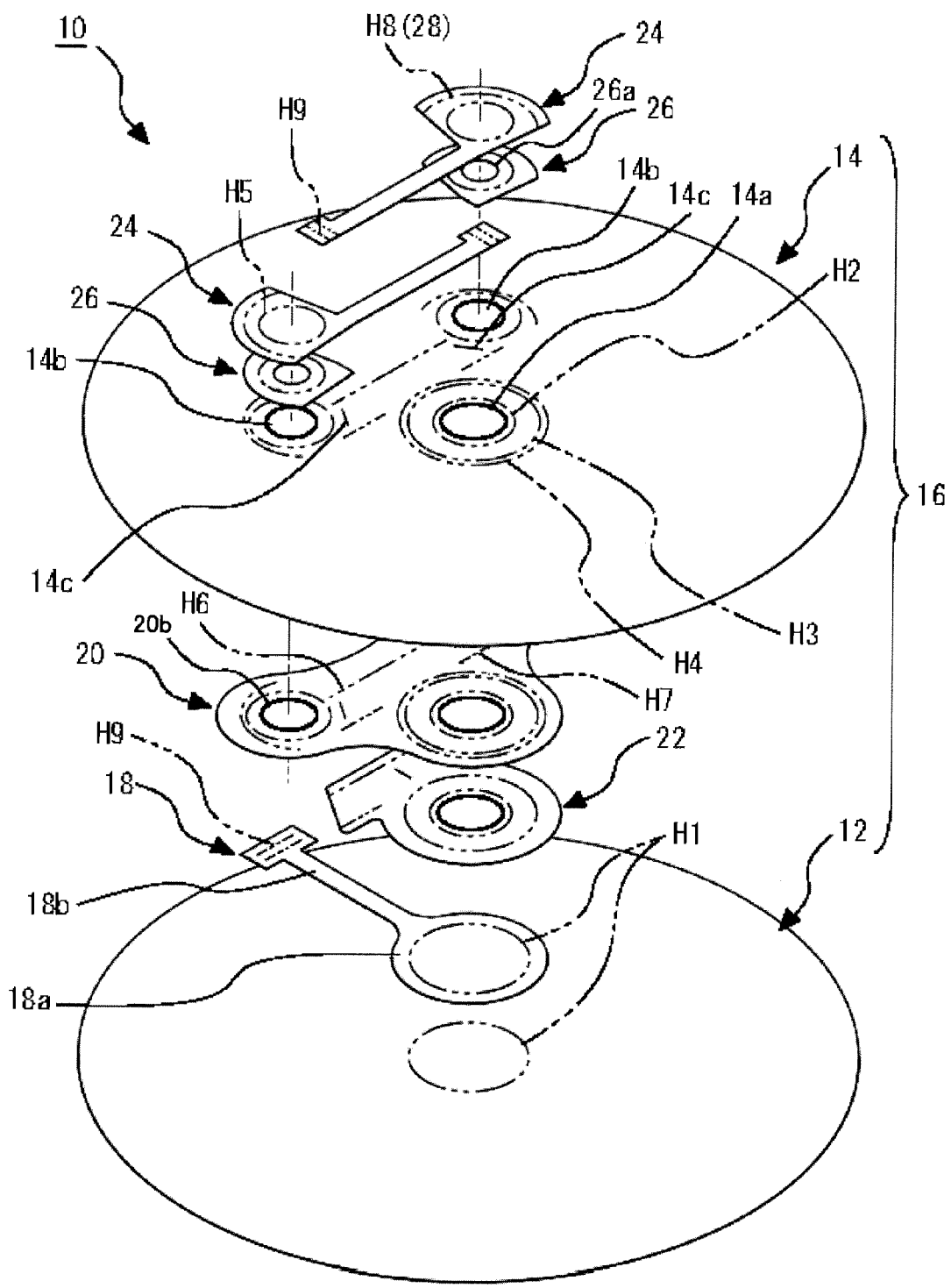
FIG. 1 is an exploded perspective view of an airbag related to an embodiment of the present invention.
Figure 2:
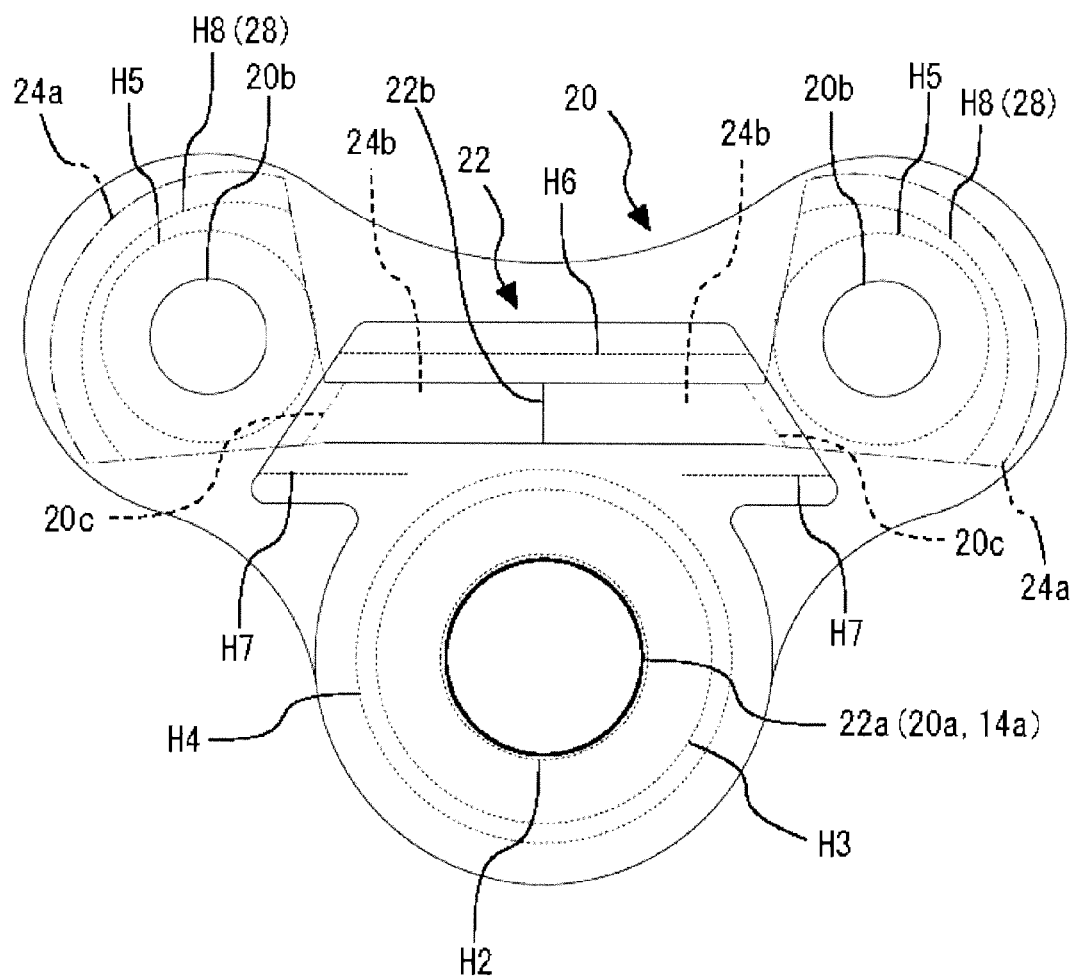
FIG. 2 is a front view of the assembled state of the main parts, showing an airbag related to an embodiment of the present invention.
Figure 3:
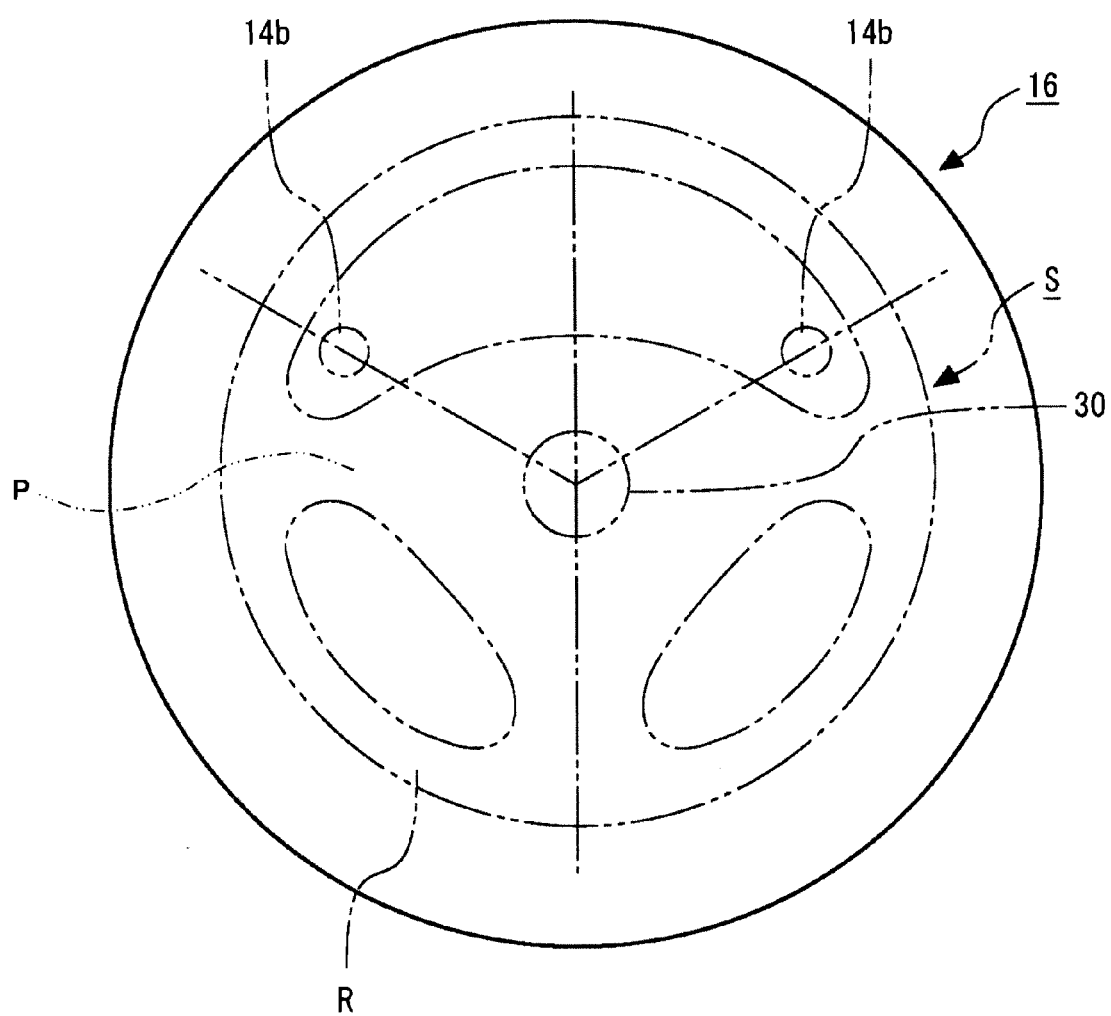
FIG. 3 is an explanatory view of the relative positional relationship between the steering wheel and vent holes, showing an airbag related to an embodiment of the present invention.
Figure 4:
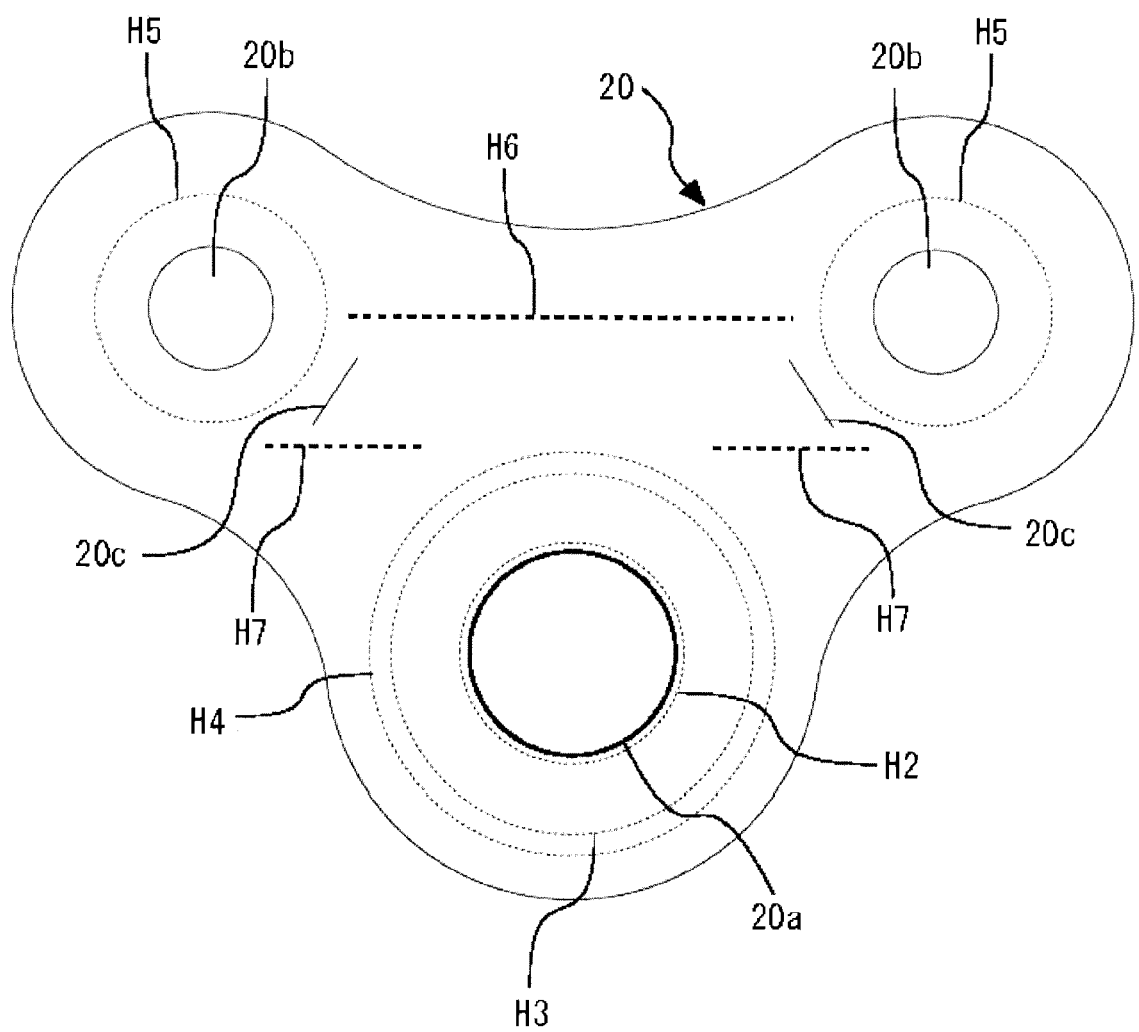
FIG. 4 is a front view of the vent patch, showing an airbag related to an embodiment of the present invention.
Figure 5:
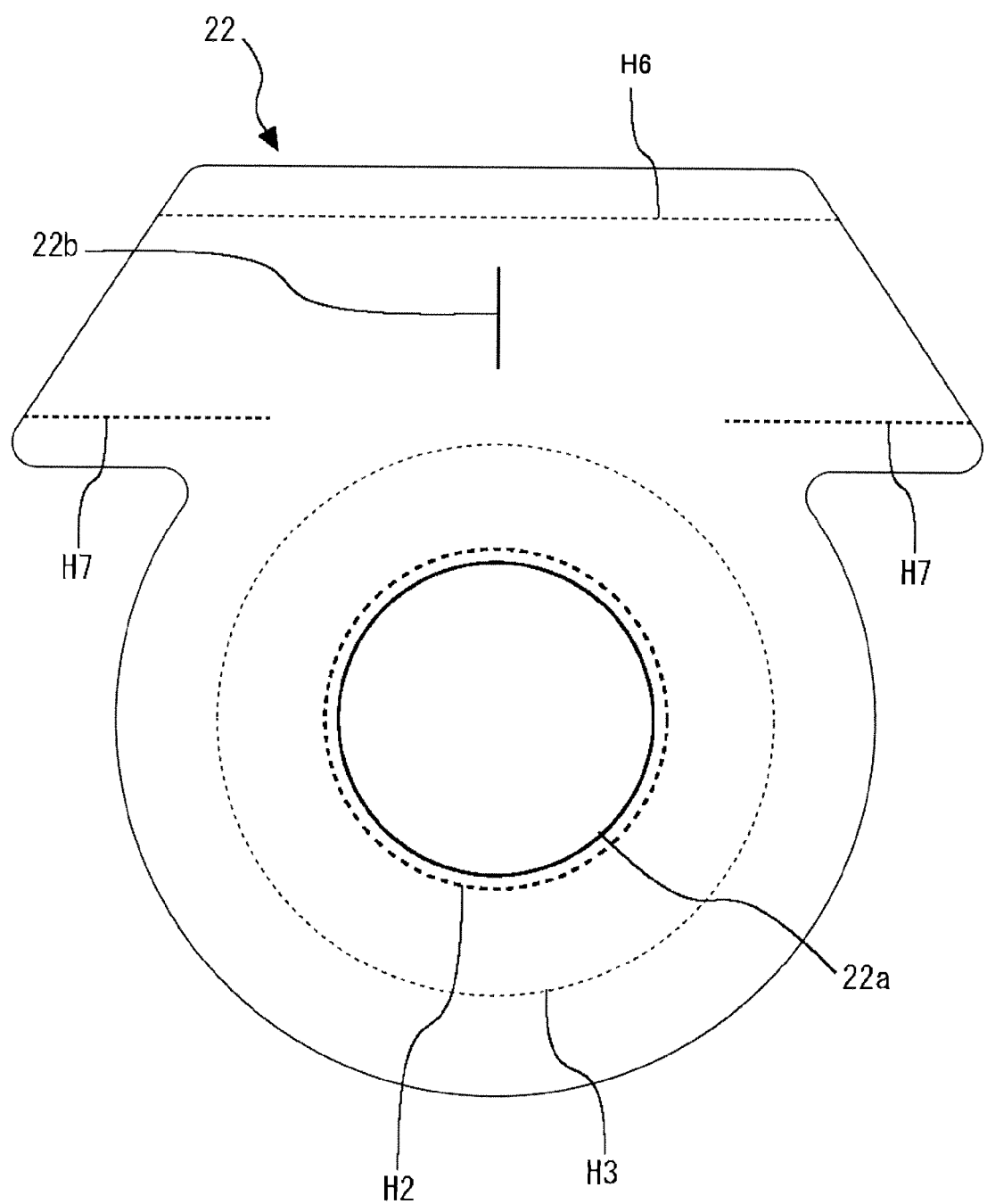
FIG. 5 is a front view of the tether cover, showing an airbag related to an embodiment of the present invention.
Figure 7:
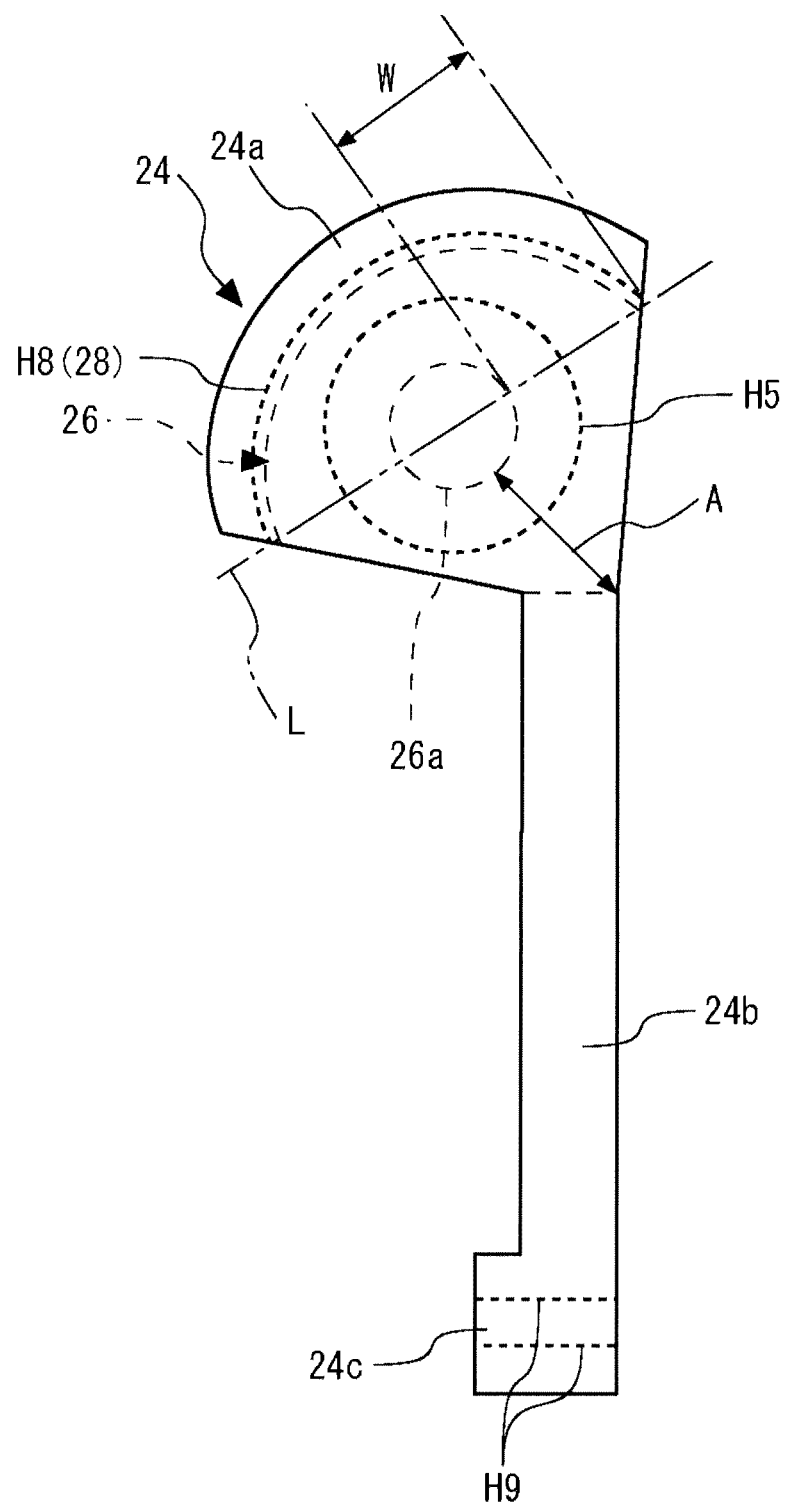
FIG. 7 is a front view of the vent cover with the patch member attached, showing an airbag related to an embodiment of the present invention.
Figure 9A:
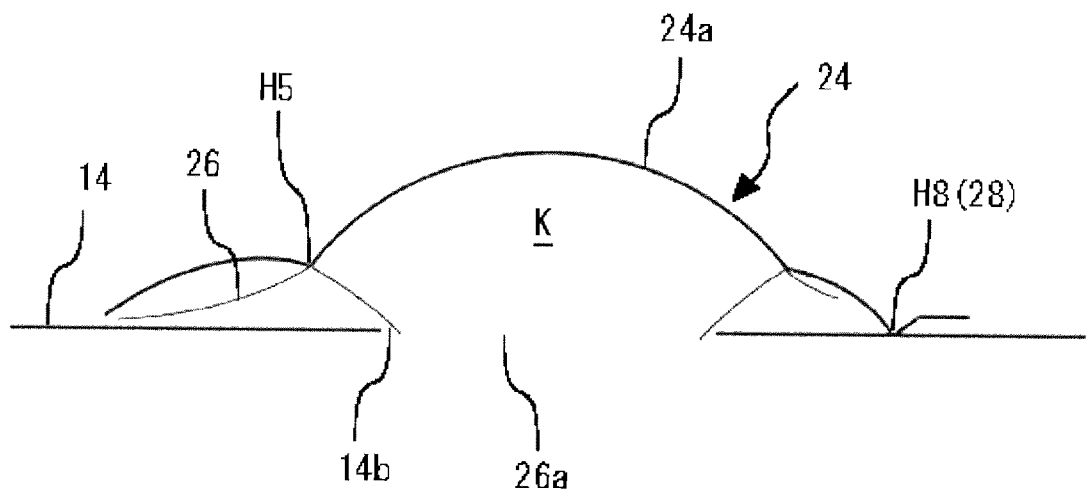
FIG. 9A is a cross-sectional view of the main parts in a state of inflation.
Figure 9B:
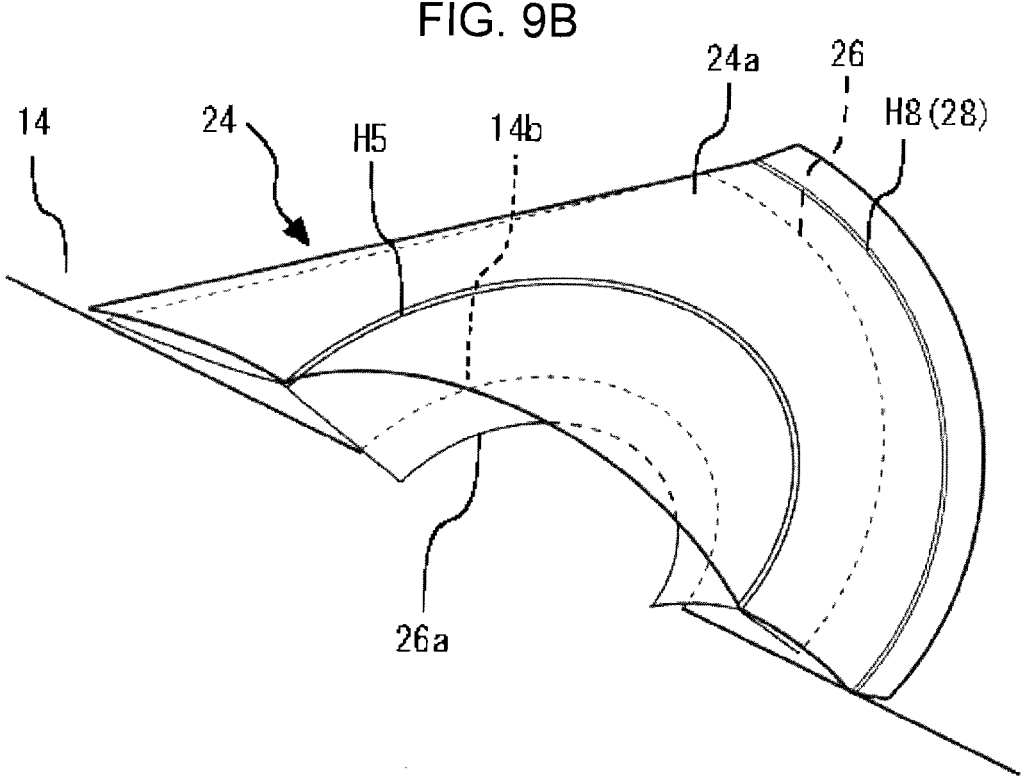
FIG. 9B is a partial perspective view of the main parts in a state of inflation, showing an airbag related to an embodiment of the present invention.

FIG. 1 is an exploded perspective view of an airbag related to an embodiment of the present invention; FIG. 2 is a front view of the assembled state of the main parts, showing an airbag related to an embodiment of the present invention; FIG. 3 is an explanatory view of the relative positional relationship between the steering wheel and vent holes, showing an airbag related to an embodiment of the present invention; FIG. 4 is a front view of the vent patch, showing an airbag related to an embodiment of the present invention; FIG. 5 is a front view of the tether cover, showing an airbag related to an embodiment of the present invention; FIG. 6A is a front view of the vent cover, and FIG. 6B is a front view of the patch member, showing an airbag related to an embodiment of the present invention; FIG. 7 is a front view of the vent cover with the patch member attached, showing an airbag related to an embodiment of the present invention; FIG. 8A is a cross-sectional view of the main parts before inflation, and FIG. 8B is a partial perspective view of the main parts before inflation, showing an airbag related to an embodiment of the present invention; and FIG. 9A is a cross-sectional view of the main parts in a state of inflation, and FIG. 9B is a partial perspective view of the main parts in a state of inflation, showing an airbag related to an embodiment of the present invention.

In FIG. 1 and FIG. 2, an airbag 10 comprises a substantially perfectly circular front panel 12 serving as a first panel positioned on a side facing an occupant, and a rear panel 14 serving as a second panel positioned on a side not facing an occupant, having substantially the same diameter as the front panel 12, and constitutes a bag-shaped airbag main body 16 with the peripheral edges thereof joined by stitching or the like. Note that, with the airbag main body 16 inflated and deployed, the front panel 12 serving as the surface facing the occupant constitutes the surface that faces (lines up with) the occupant, that is, the front surface that the occupant actually contacts (using the occupant as reference). Further, the rear panel 14 constitutes a surface, which excludes the front panel 12, of the three-dimensional shape of the airbag main body 16 when inflated and deployed into a bag shape and, according to the three-dimensional shape, includes the side surfaces such as the side panels and the like.

An inflation control member 18 is disposed on the front panel 12, near the center. This inflation control member 18 integrally comprises a joining part 18a that is joined by stitching H1 (shown by the double-dashed chain line in FIG. 1 only) to the center of the front panel 12, and a strip-shaped regulating part 18b that extends from the joining part 18a.

A substantially triangular shaped vent patch 20 and a tether cover 22 are disposed on the inner surface of the rear panel 14. Further, vent covers 24 and patch members 26 are disposed on the outer surface of the rear panel 14.

An inflator insertion hole 14a is formed near the center of the rear panel 14. A pair of vent holes 14b is formed on the rear panel 14, on the vehicle body upward (frontward) side from the center of the rear panel 14, in the state attached to the vehicle body (the state attached to the steering wheel). The vent holes 14b are formed so that each comprises an opening center in a radial direction from the center of the rear panel 14, and so that, for example, they are symmetrical in the 2 o'clock and 10 o'clock directions, using the short hand of the clock as reference, with respect to a center line (the 0 o'clock direction) of a steering wheel S that extends in the vehicle body front-rear direction, as shown in FIG. 3. Note that the vent holes 14b are formed in the center of the rear panel 14, that is, in positions near an inflator 30 of an inflator device, and are set so that venting is possible from the initial stage of deployment. At this time, the pair of vent holes 14b is disposed in a space that avoids a spoke P that extends from near the center toward a wheel rim R of the steering wheel S, further on the inside than the wheel rim R. Further, the vent holes 14b are disposed in positions capable of avoiding interference (overlap) between an opened airbag lid (not shown) formed on the steering wheel S and the vent holes 14b. A pair of slits 14c is formed on the rear panel 14, in positions near the respective vent holes 14b.

The vent patch 20 is formed from cloth of the same material as the front panel 12 and the rear panel 14, in a substantially triangular shape with each corner area made into an arc shape, as shown in FIG. 4. A second inflator insertion hole 20a that agrees with the aforementioned inflator insertion hole 14a, a pair of vent holes 20b that agrees with the vent holes 14b, and a pair of slits 20c that agrees with the respective slits 14c are formed on the vent patch 20. The vent patch 20 is joined to the rear panel 14 by stitching H2, H3, H4 in an annular (perfectly circular) manner so as to surround the second inflator insertion hole 20a, for example. Further, the vent patch 20 is joined to the rear panel 14 by stitching H5 in an annular (perfectly circular) manner so as to surround the vent hole 20b. Furthermore, the vent patch 20 is extended so as to straddle the pair of slits 20c, and is joined by parallel stitching H6, H7, sandwiching the slits 20c.

The tether cover 22 is formed from cloth of the same material as the front panel 12 and the rear panel 14, as shown in FIG. 5, forming a third inflator insertion hole 22a that agrees with the inflator insertion hole 14a, and a slit 22b positioned on the center line (0 o'clock direction) that extends in the vehicle body front-rear direction. Note that the tether cover 22 is atypically formed so as to avoid the vent holes 20b, and the slit 22b is formed so as to be positioned between the pair of slits 20c. The tether cover 22 is integrally joined to the rear panel 14 with the vent patch 20 (by the stitching H2, H3, H6, H7). The tether cover 22 covers the slits 20c of the vent patch 20 on both ends thereof, improving the seal integrity by blocking the communicated state with the exterior via the slits 14c of the rear panel 14.

The vent covers 24, as shown in FIG. 6A, each comprise a fan-shaped cover 24a, a strip-shaped tether 24b that extends from the cover 24a, and a joining piece 24c that is wider than the tether 24b and positioned at the tip end of the tether 24b. Note that the vent covers 24 are individually correspondingly disposed on the respective vent holes 14b. At this time, the vent covers 24 used are identical in shape, size, and the like (apparently with the front and rear reversed in the attached state) and, as shown in FIG. 1, are symmetrically disposed with respect to each other. According to this embodiment, the pair of vent holes 14b is symmetrically disposed with respect to the center line (0 o'clock direction). Accordingly, the pair of vent covers 24 is also symmetrically disposed with respect to the center line of the rear panel 14 (the airbag main body 16). The arc-shaped peripheral edges of the covers 24a of the vent covers 24 are each joined to the rear panel 14 by stitching H8, and the vent covers 24 each constitute a hinge part 28 by the stitching H8. Hence, the hinge parts 28 are each formed on the introduction direction (jetting direction) downstream side of the pressurized gas jetted from the inflator 30 disposed in the center of the rear panel 14, that is, on the outer circumference side of the rear panel 14. Accordingly, the arc centers of the hinge parts 28 are each preferably positioned on the extending line of the line that connects the center of the rear panel 14 and the center of the vent hole 14b. The tethers 24b are each inserted into the slit 14c and the slit 20c and then pulled out from the slit 22b via the area between the vent patch 20 and the tether cover 22 (between the stitching H6 and the stitching H7), and subsequently the joining pieces 24c of the respective ends are joined by stitching H9. The length of the tethers 24b is set so as to regulate the opening degrees of the covers 24a using the slit 22b as reference when the joining pieces 24c thereof are joined. Further, the pair of tethers 24b is joined with the tip end of the regulating part 18b of the inflation control member 18 by the stitching H9, thereby regulating the thickness of the airbag main body 16 when the airbag main body 16 inflates and deploys, in accordance with the lengths of the pair of tethers 24b and the regulating part 18b. Further, the tether 24b, which is one end of the vent cover 24, passes through the slit 20c and the slit 22b, thereby making the cloth of the slit 20c less susceptible to stretching by the pressurized gas jetted from the inflator 30, reducing gas leakage.

The patch member 26, as shown in FIG. 6B, is formed into a fan shape, and an opening 26a having a smaller diameter than that of the opening of the vent hole 14b is formed in the center thereof According to this embodiment, as shown in FIG. 7, the patch member 26 is joined to the cover 24a by the stitching H5 so as to surround the opening 26a.

In the above described configuration, as shown in FIGS. 8A and 8B, the covers 24a and the patch members 26 are positioned so as to extend along the rear panel 14 in a stored state with the inflator 30 not activated.

When the inflator 30 activates and the pressurized gas is supplied to the interior of the airbag main body 16, a portion thereof attempts to be released from the vent holes 14b to the exterior. Hence, as the airbag main body 16 inflates, tension is applied to the regulating part 18b and the tethers 24b, thereby producing tensile force and regulating the opening degrees of the covers 24a. Further, a portion of the pressurized gas is supplied between the covers 24a and the patch members 26 from the openings 26a and, as shown in FIGS. 9A and 9B, the covers 24a and the patch members 26 inflate in cooperation, pressing the vent holes 14b while forming a space K between the covers 24a and the patch members 26 for pressurized gas accumulation. Accordingly, by the inflation of the covers 24a and the patch members 26 in addition to the regulation of the opening degrees of the covers 24a by the tensile force of the tethers 24b described above, it is possible to highly maintain the seal integrity of the vent holes 14b.

Further, the other end (the regulating part 18b) of the inflation control member 18 that regulates thickness when the airbag main body 16 inflates and deploys, and both ends (the joining pieces 24c) of the tethers 24b are joined, making it possible to regulate thickness during inflation of the airbag main body 16 by the entire length of the regulating part 18b and the tethers 24b and, with the pulling action produced on the tethers 24b by the inflation and deployment of the airbag main body 16, press the vent covers 24 in the closing direction of the vent holes 14b.

As described above, according to the airbag 10 in this embodiment, the airbag main body 16 is formed into a bag so as to comprise at least the front panel 12 and the rear panel 14 in an inflated and deployed state, the vent holes 14b are formed on the rear panel 14, the vent covers 24 that open and close the vent holes 14b are attached to the outer surface of the rear panel 14, the patch members 26 are attached to the vent covers 24, and the opening degrees of the vent holes 14b are regulated by the vent covers 24 and the patch members 26 inflating in cooperation using a portion of the pressurized gas supplied to the interior of the airbag main body 16 when the airbag main body 16 inflates and deploys. That is, when the pressurized gas is introduced into the interior of the airbag main body 16, the gas attempts to leak out from the vent holes 14b.

Hence, the pressurized gas that attempts to leak out is captured between the vent covers 24 and the patch members 26 (specifically, in spaces K for gas accumulation that are formed on the outer circumference side of the above described openings 26a, between the vent covers 24 and the patch members 26) from the openings 26a. At this time, in particular, the patch members 26 each comprise the opening 26a facing the vent hole 14b and are joined to the vent cover 24 so as to surround the opening 26a, thereby efficiently capturing the pressurized gas that attempts to leak from the vent hole 14b in the above described space K for gas accumulation from the opening 26a. As a result, each joined body of the vent cover 24 and the patch member 26 acts so as block the vent hole 14b while inflating, making it possible to set the opening degree of the vent hole 14b to a closed or slightly open state and maintain the high internal pressure of the airbag main body 16.

Note that the joining pieces 24c of the pair of tethers 24b and the tip end of the regulating part 18b are joined, thereby causing a pulling action to be produced on the tethers 24b when the airbag main body 16 inflates and deploys, and the vent covers 24 to press in the closing direction of the vent holes 14b. Further, the joining pieces 24c of the pair of tethers 24b are joined together, causing the pair of vent holes 14b to operate simultaneously, making it possible to make the opening degrees of the pair of vent holes 14b uniform. At this time, the inflation control member 18 and the slit 22b of the tether cover 22 are disposed in the center (0 o'clock direction), making it possible to even more easily make the opening degrees of the pair of vent holes 14b uniform with both serving as mutual targets.

On the other hand, when an occupant contacts the airbag main body 16, the vent covers 24 are pressed by the pressure, making it possible to open the vent holes 14b, release the pressurized gas inside the airbag main body 16 to the exterior, and smoothly receive and hold the occupant.

Further, in particular, according to this embodiment, the vent covers 24 each comprise the hinge part 28 joined with the rear panel 14 on the introduction direction downstream side of the pressurized gas introduced into the interior of the airbag main body 16, thereby making it possible to receive and hold the pressurized gas that is introduced into the airbag main body 16 and attempts to leak from the vent hole 14b by the hinge part 28. Further, this makes it possible to easily suppress the opening of the vent covers 24 and, at the same time, more easily inflate the airbag main body 16 by the cooperation of the vent covers 24 and the patch members 26.

Further, in particular, according to this embodiment, the tethers 24b serving as regulating members that regulate the opening degrees of the vent covers 24 are disposed on the vent covers 24 on the reverse side of the hinge part 28, making it possible to press the patch members 26 on the vent holes 14b when inflated by the cooperation with the patch members 26, and easily and highly ensure the sealing positions of the vent holes 14b.

Modification

Figure 10:
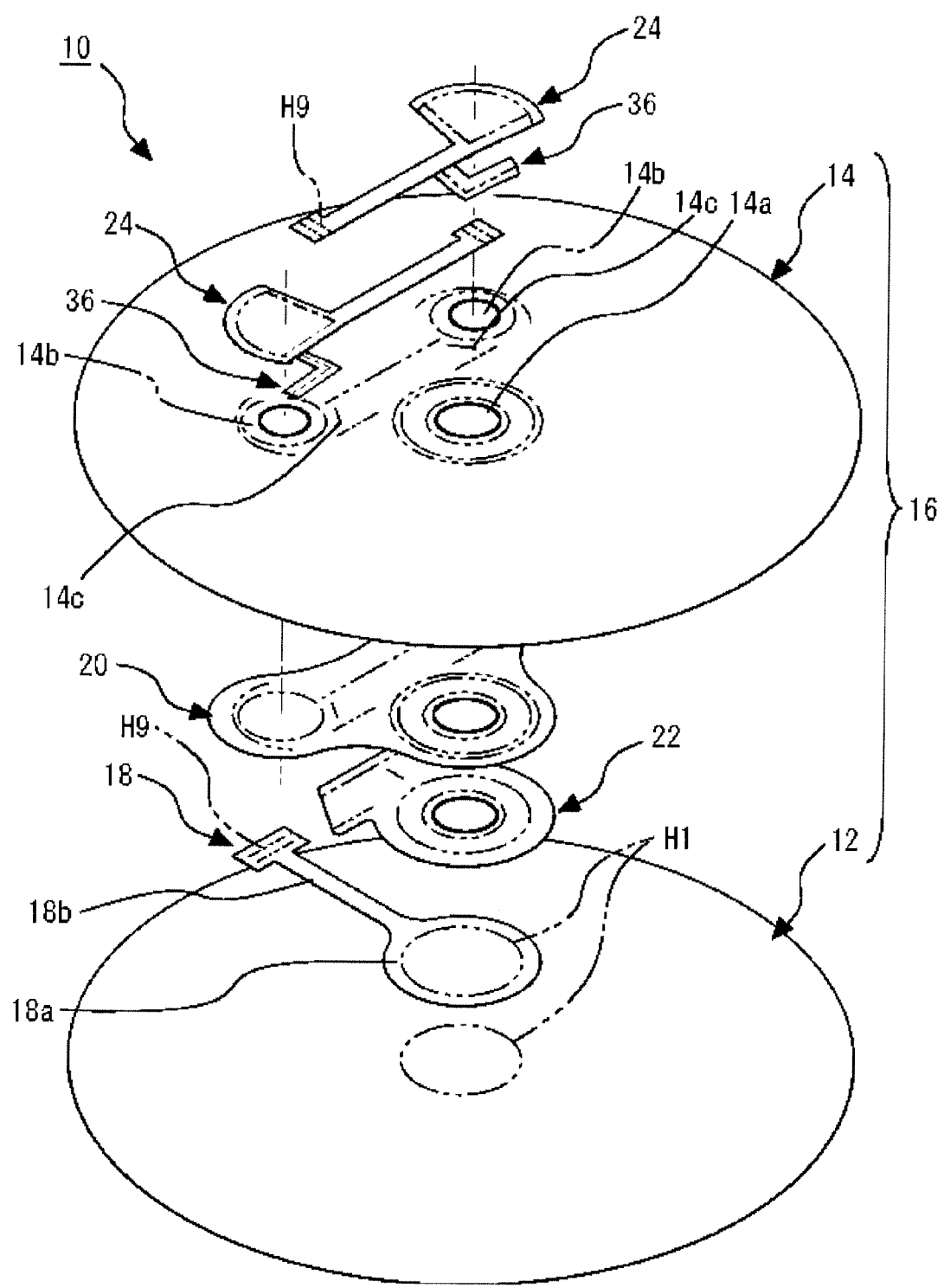
FIG. 10 is an exploded perspective view of an airbag related to a modification of an embodiment of the present invention.
Figure 11A:
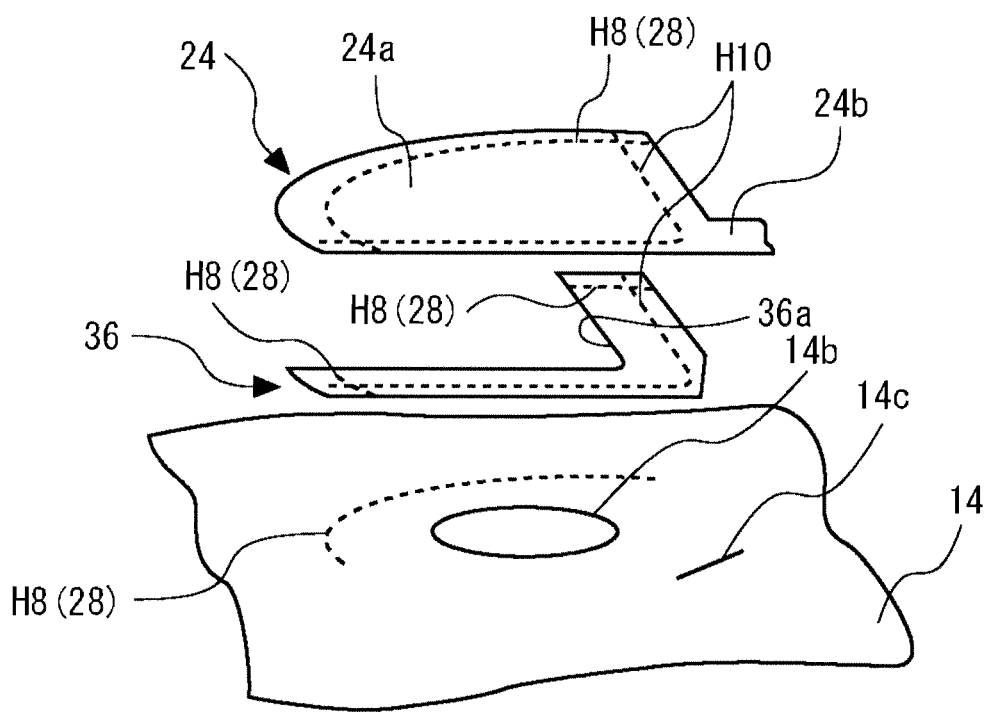
FIG. 11A is an exploded perspective view of the main parts.
Figure 11B:
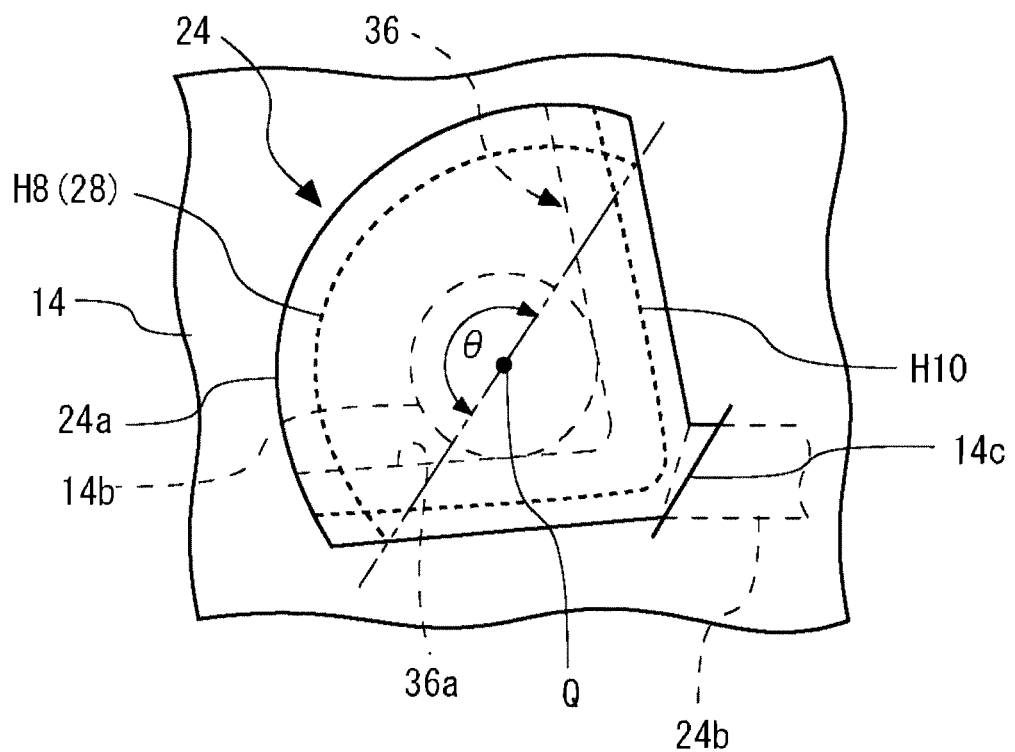
FIG. 11B is a front view of the main parts, showing an airbag related to a modification of an embodiment of the present invention.
Figure 13:
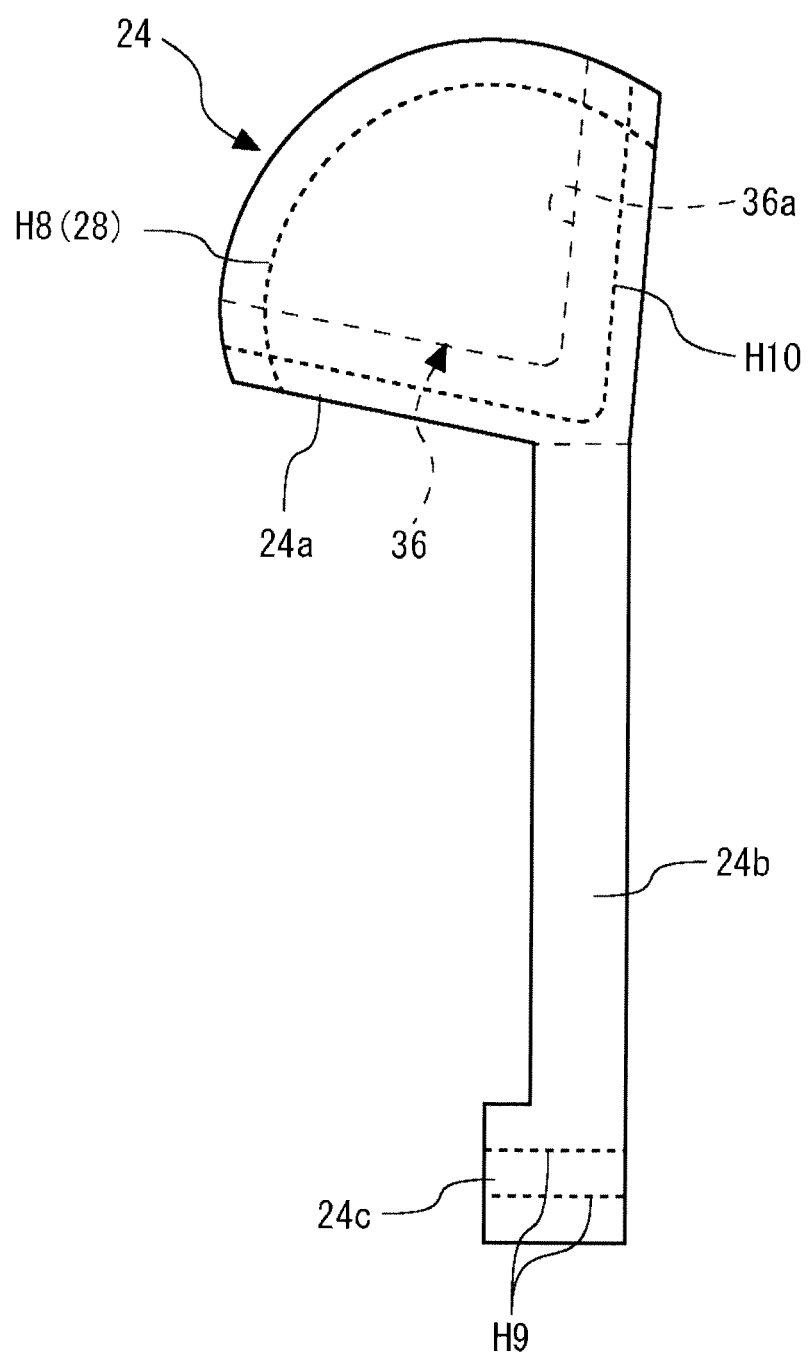
FIG. 13 is a front view of the vent cover with the patch member attached, showing an airbag related to a modification of an embodiment of the present invention.
Figure 14A:
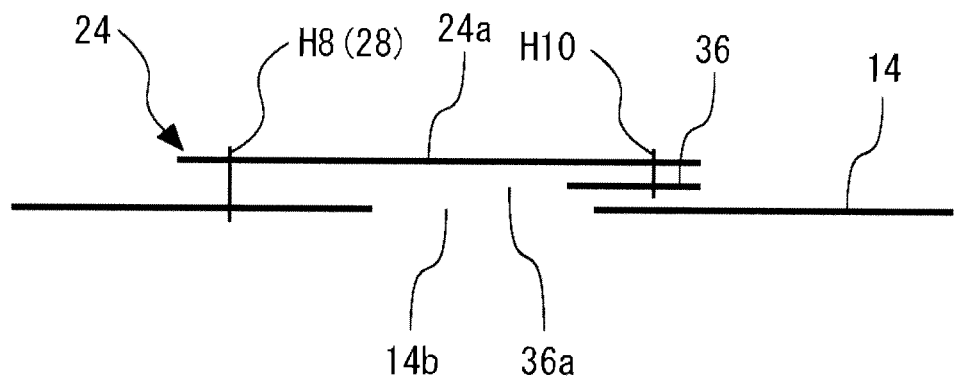
FIG. 14A is a cross-sectional view of the main parts before inflation.
Figure 14B:
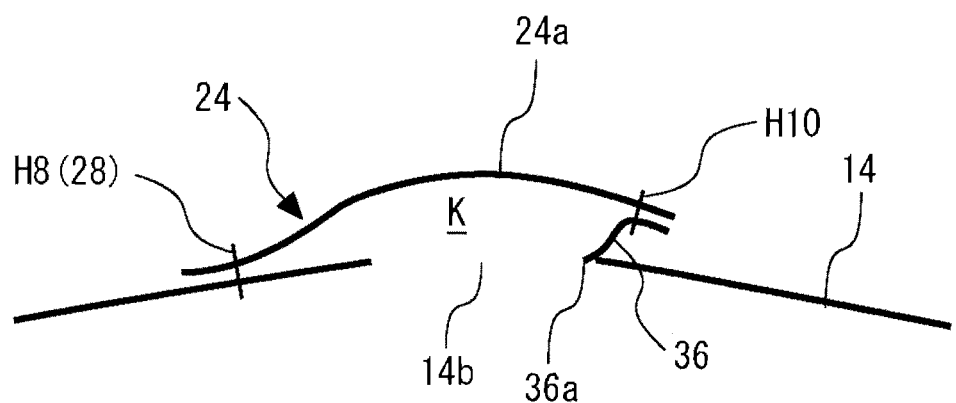
FIG. 14B is a cross-sectional view of the main parts in a state of inflation.
Figure 14C:
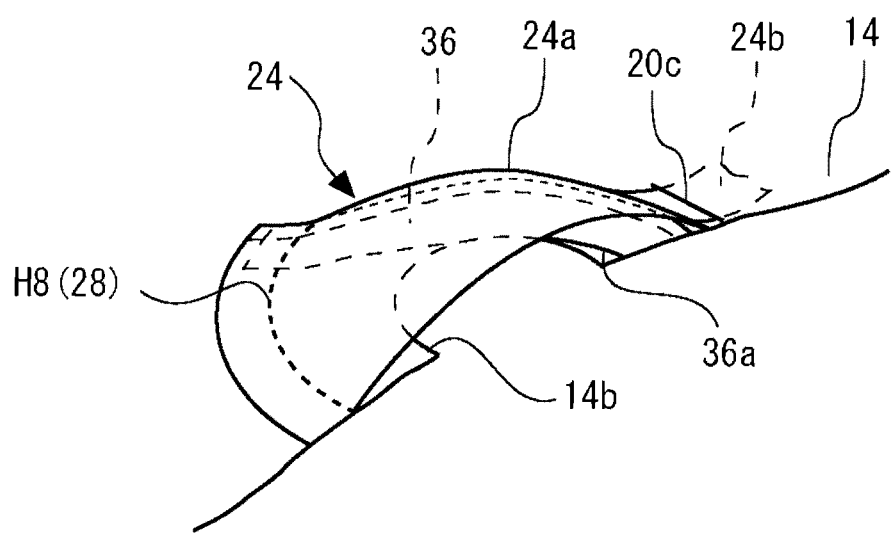
FIG. 14C is a partial perspective view of the main parts in a state of inflation, showing an airbag related to modification of an embodiment of the present invention.
Figure 15:
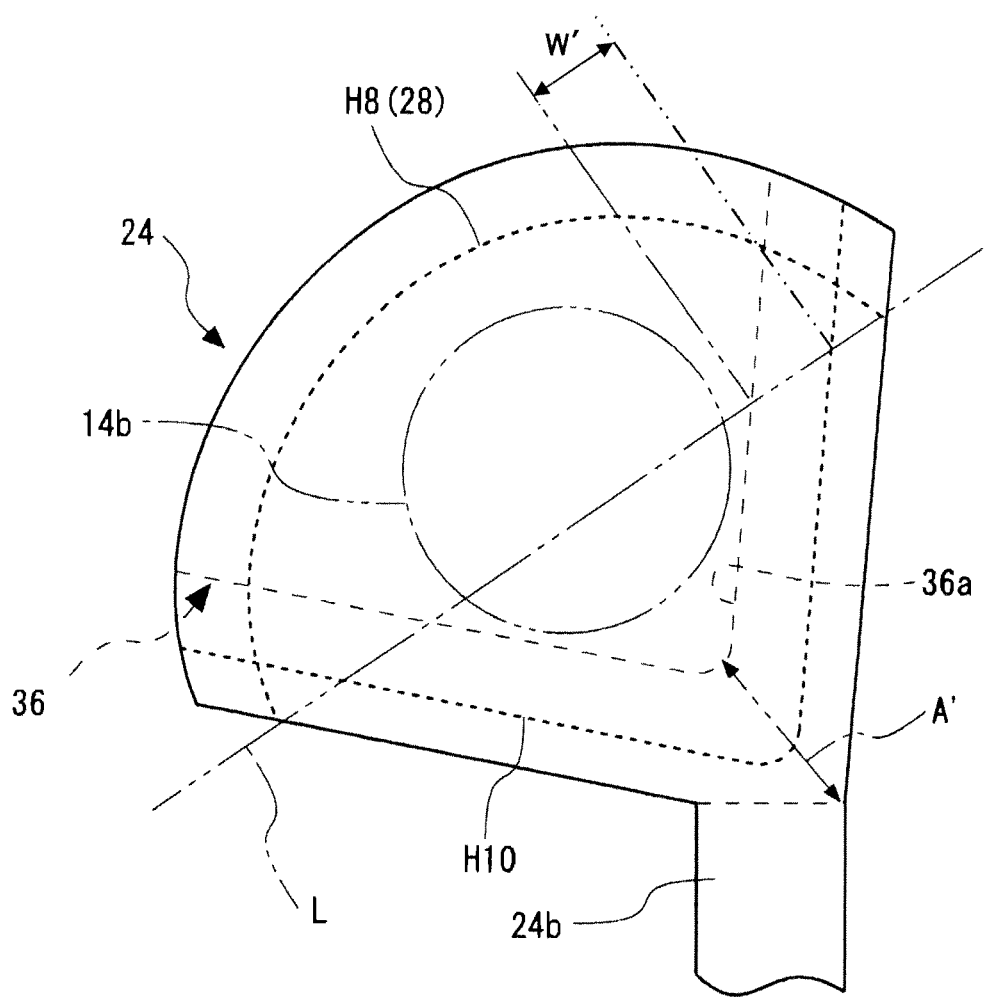
FIG. 15 is an action explanatory view showing an airbag related to a modification of an embodiment of the present invention.

However, while the patch member 26 that forms the opening 26a from a hole having a smaller diameter than the vent hole 14b is indicated in the above described embodiment, the opening 26a does not need to be a hole. FIGS. 10-15 show an airbag related to a modification of an embodiment of the present invention, wherein: FIG. 10 is an exploded perspective view of an airbag related to a modification; FIG. 11A is an exploded perspective view of the main parts, and FIG. 11B is a front view of the main parts, showing an airbag related to a modification; FIG. 12A is a front view of the vent cover, and FIG. 12B is a front view of the patch member, showing an airbag related to a modification; FIG. 13 is a front view with the patch member attached to the vent cover, showing an airbag related to a modification; FIG. 14A is a cross-sectional view of the main parts before inflation, FIG. 14B is a cross-sectional view of the main parts in a state of inflation, and FIG. 14C is a partial perspective view of the main parts in a state of inflation, showing an airbag related to a modification; and FIG. 15 is an action explanatory view showing an airbag related to a modification. Note that, in FIGS. 10-15, components identical to those in the above described embodiment are denoted using the same reference numerals, and descriptions thereof are omitted.

As shown in FIG. 10 and FIG. 11, a patch member 36 is disposed between the rear panel 14 and the vent cover 24 (cover 24a). The patch member 36 is a substantially V- and strip-shaped member that extends along the other two sides of the cover 24a, excluding the arc-shaped side that is joined with the rear panel 14 by the stitching H8.

The area near the outer edge of the patch member 36, as shown in FIG. 12 and FIG. 13, is joined to the above described other two sides of the cover 24a by stitching H10 so that the inner edge side (the vent hole 14b side) is a free end. Note that the angle of the interior angle resulting from the two sides of the patch member 36 is arbitrary, according to the shape and the like of the cover 24a. Further, the patch member 36 establishes the interior angle side resulting from the above described other two sides where the vent hole 14b is positioned as an opening 36a.

At this time, for example, the inner edge of the patch member 36 and the opening edge of the vent hole 14b may tangentially overlap as shown in FIG. 11B, a portion of the inner edge side of the patch member 36 may enter the opening of the vent hole 14b as shown in FIG. 14A, and the overall patch member 36 may be separated from the vent hole 14b as shown in FIG. 15. In other words, the patch member 36 used may be the same regardless of the size of the vent hole 14b.

In the configuration of this modification such as described above, the covers 24a and the patch members 36 are positioned so as to extend along the rear panel 14, as shown in FIG. 14A, in a stored state with the inflator 30 not activated.

When the inflator 30 activates and the pressurized gas is supplied to the interior of the airbag main body 16, a portion thereof attempts to be released from the vent holes 14b to the exterior. Hence, a portion of the pressurized gas is supplied between the covers 24a and the patch members 36 from the openings 36a and, as shown in FIG. 14B and FIG. 14C, the cover 24a and the patch member 36 inflate in cooperation, regulating the opening degrees so that the vent holes 14b are in a closed or slightly open state. Further, the opening degrees of the covers 24a are regulated by the tensile force of the tethers 24b and the covers 24a are pressed toward the vent holes 14b, making it possible to highly maintain the sealing positions of the vent holes 14b.

Further, the other end (the regulating part 18b) of the inflation control member 18 that regulates thickness when the airbag main body 16 inflates and deploys, and both ends (the joining pieces 24c) of the tethers 24b are joined, making it possible to regulate the thickness of the airbag main body 16 by the entire length of the regulating part 18b and the tethers 24b and, with the pulling action produced on the tethers 24b by the inflation and deployment of the airbag main body 16, press the vent covers 24 in the closing direction of the vent holes 14b.

At this time, since there is little resistance to venting the pressurized gas in the interior of the airbag main body 16 when contacted by the occupant, the patch members 36 can efficiently vent the pressurized gas from the vent holes 14b. Moreover, the patch members 36 do not substantially interfere with the vent holes 14b directly and therefore do not become a factor in hindering venting, making it possible to improve the robustness during venting.

Hence, the vent covers 24 during gas venting open with the line that connects the areas near both ends of the stitching H8 that joins the vent covers 24 with the rear panel 14 (refer to the imaginary line L in FIG. 15) as the center, for example. As a result, a distance W' from the outer side edge to the inner side edge of the strip-shaped patch member 36 in the direction extending along this center (the imaginary line L) can be shortened compared to a distance W (refer to FIG. 7) in the case of the patch member 26.

That is, the diameter of the opening 26a of the patch member 26 is set smaller than the diameter of the vent hole 14b. On the other hand, a portion of the inner edge of the patch member 36 either enters the vent hole 14b (FIG. 14), contacts the opening edge of the vent hole 14b (FIG. 11), or is separated from the vent hole 14b (FIG. 15), thereby making the distance W' in the case of the patch member 36 shorter than the distance W in the case of the patch member 26. Thus, the patch members 36 make it possible to easily open the vent covers 24 and decrease the venting resistance with respect to the pressurized gas that enters the spaces K (refer to FIG. 14B) during inflation by the cooperation of the rear panel 14 and the cover parts 24a. Accordingly, it is possible to smoothly vent the pressurized gas from the vent holes 14b via the spaces K from the interior of the airbag main body 16. Moreover, the area ratio of the opening area of the vent hole 14b and the overall area of the patch member 36 is small compared to the area ratio of the opening area of the vent hole 14b and the overall surface of the patch member 26. This makes it possible to reduce the material cost of the patch member 36 to a greater degree than the patch member 26.

Furthermore, as shown in FIG. 15, the patch member 36 makes it possible to make a distance A' from a boundary part between the cover 24a and the tether 24b to the inner edge of the nearest patch member 36 shorter than a distance A (refer to FIG. 7) in the case of the patch member 26. Accordingly, it is possible to decrease the venting resistance of the patch member 36 with respect to the pressurized gas near a pulling action point (the boundary part between the cover 24a and the tether 24b) that regulates the opening degree of the cover 24a. With this arrangement, the pressurized gas is efficiently vented from the area near this pulling action point, which is also near the arc center of the hinge part 28 (the stitching H8).

At this time, for example, as shown in FIG. 11B, an interior angle θ formed by line segments that connect a center Q of the vent hole 14b and both ends of the stitching H8 that forms the hinge part 28 is set to 180° or less, thereby making it possible to ensure a larger opening area of the vent hole 14b facing the part positioned further on the outside than the line connecting both ends of the hinge part 28, that is, on the side opposite the hinge part 28 of the cover 24a of the vent cover 24, and thus ensure high venting efficiency of the pressurized gas from the vent hole 14b.

Note that, as shown in FIG. 16, if the interior angle θ formed by the line segments that connect the center Q of the vent hole 14b and both ends of the stitching H8 that forms the hinge part 28 is set to a more acute angle, it is possible to ensure even higher venting efficiency of the pressurized gas from the vent hole 14b.

Note that while the above embodiments and modification have described illustrative scenarios in which the configuration of the airbag 10 that uses the patch members 26, 36 of the present invention is applied to the airbag 10 of a driver airbag device assembled to the steering wheel, the present invention is not limited thereto. That is, the configuration of the airbag 10 that uses the patch members 26, 36 of the present invention can be applied to a general airbag that comprises a vent hole, such as an airbag of an airbag device for a passenger seat comprising a side panel (a side surface), and an airbag of a variety of airbag devices, such as a side airbag device and the like.

Furthermore, while the embodiment and modification described above are preferred examples of the present invention, the present invention is not limited thereto, and various modifications may be further made without deviating from the spirit and scope of the present invention.

What is claimed is:

1. An airbag comprising:
an airbag main body formed into a bag so as to comprise at least a first panel on a side facing an occupant and a second panel on a side not facing the occupant in an inflated and deployed state;
at least one vent hole formed on said second panel;
at least one vent cover that is attached to an outer surface of said second panel and opens and closes said vent hole; and
at least one patch member that is joined to said vent cover between said second panel and said vent cover and has an opening that communicates with said vent hole, and,
wherein said vent cover comprises a hinge part joined with said second panel on one side and a regulating member that regulates an opening degree of said vent cover on the other side.

2. The airbag according to claim 1, wherein:
said patch member communicates with said vent hole by a hole facing said vent hole serving as said opening, and is joined to said vent cover in an area that surrounds an outer circumference side of said hole.

3. The airbag according to claim 1, wherein:
said vent cover is formed into a substantially fan shape that is larger than said vent hole, with an arc-shaped part of one side thereof serving as said hinge part;
said patch member is a substantially V-and strip-shaped member that extends along the other two sides of said vent cover; and
an area near an outer edge of said strip-shaped member is joined with said vent cover and an inner edge side of said strip-shaped member is set as a free end.

4. The airbag according to claim 3, wherein:
said vent cover is joined with said second panel so that an interior angle formed by line segments connecting a center of said vent hole and both ends of said hinge part is 180° or less.

5. An airbag device comprising:
an airbag according to claim 1; and
an inflator that supplies a pressurized gas to said airbag.

* * * * *